(12) United States Patent
Okaya et al.

(10) Patent No.: US 11,762,726 B2
(45) Date of Patent: Sep. 19, 2023

(54) INFORMATION PROCESSING APPARATUS, INFORMATION PROCESSING METHOD, AND PROGRAM

(71) Applicant: NS Solutions Corporation, Tokyo (JP)

(72) Inventors: Masahiro Okaya, Tokyo (JP); Hajime Aizawa, Tokyo (JP); Toru Yamaguchi, Tokyo (JP)

(73) Assignee: NS SOLUTIONS CORPORATION, Tokyo (JP)

( * ) Notice: Subject to any disclaimer, the term of this patent is extended or adjusted under 35 U.S.C. 154(b) by 216 days.

(21) Appl. No.: 17/215,830

(22) Filed: Mar. 29, 2021

(65) Prior Publication Data
US 2021/0303382 A1    Sep. 30, 2021

(30) Foreign Application Priority Data
Mar. 31, 2020   (JP) ................. 2020-062302

(51) Int. Cl.
*G06F 11/07*    (2006.01)
*G06F 18/21*    (2023.01)
(Continued)

(52) U.S. Cl.
CPC .......... *G06F 11/079* (2013.01); *G06F 18/217* (2023.01); *G06F 18/2113* (2023.01); *G06N 5/01* (2023.01)

(58) Field of Classification Search
CPC .... G06F 11/079; G06F 11/07; G06F 11/3447; H04L 41/0631; G06N 20/00; G05B 23/0248; G05B 23/0275; G05B 23/0281
See application file for complete search history.

(56) References Cited

U.S. PATENT DOCUMENTS 7,337,090 B1 *   2/2008   Yemini ............... G06F 11/2257
                                                      702/183
9,104,572 B1 *   8/2015   Thompson .......... G06F 11/3055
(Continued)

FOREIGN PATENT DOCUMENTS

CN          104572329 A       4/2015
JP          S61-245210 A     10/1986
(Continued)

OTHER PUBLICATIONS

Communication from the Japanese Patent Office in application No. 2020-062302, dated May 30, 2023.

*Primary Examiner* — Yolanda L Wilson
(74) *Attorney, Agent, or Firm* — ArentFox Schiff LLP

(57) ABSTRACT

An information processing apparatus includes: a reception module configured to receive selection of an output signal corresponding to a root cause from a group including a plurality of output signals, the plurality of output signals being obtained from a plurality of devices to be managed and being obtained in a predetermined period; a replacement module configured to replace a selection result received by the reception module with a combination of the selection results in two output signals, the selection result being corresponding to the group, the two output signals being selected from the plurality of output signals; and a model generation module configured to generate a ranking model of the plurality of output signals based on the selection results after the replacement.

14 Claims, 12 Drawing Sheets

(51) Int. Cl.
*G06F 18/2113* (2023.01)
*G06N 5/01* (2023.01)

(56) References Cited

U.S. PATENT DOCUMENTS

| | | | |
|---|---|---|---|
| 2011/0276828 A1 | 11/2011 | Tamaki et al. | |
| 2016/0162346 A1* | 6/2016 | Kushnir | G06F 11/079 |
| | | | 714/37 |
| 2017/0102984 A1* | 4/2017 | Jiang | G06F 11/0751 |
| 2017/0228277 A1* | 8/2017 | Cheng | G06F 11/0709 |
| 2017/0372212 A1* | 12/2017 | Zasadzinski | H04L 41/0631 |
| 2021/0067401 A1* | 3/2021 | Abe | H04L 41/069 |

FOREIGN PATENT DOCUMENTS

| | | |
|---|---|---|
| JP | H06-301878 A | 10/1994 |
| JP | 3082548 B2 | 8/2000 |
| JP | 2009-064407 A | 3/2009 |
| JP | 2010-122847 A | 6/2010 |
| WO | WO-2010/082322 A1 | 7/2010 |

* cited by examiner

Fig. 2

| RECORD NO. | TIME OF OCCURRENCE | ALARM CLASSIFICATION | ALARM ID | ALARM NAME | FLAG |
|---|---|---|---|---|---|
| 001 | 0:00:0 | Warning | 1 | ERROR PROBABILITY HAS EXCEEDED THRESHOLD. | |
| 002 | 0:05:09 | Other | 2 | ●● PROCESS HAS STARTED. | |
| ... | | | | | |
| 006 | 0:07:15 | Warning | 6 | HARDWARE FAILURE HAS OCCURRED. | ○ |
| ... | | | | | |
| 109 | | | | | |
| 110 | | | | | |
| ... | | | | | |

111

211 (records 001–109)

212 (records 110–...)

$V_{6J}=(1,1,1,1,1,0,1\cdots)$

|   | 1 | 2 | 3 | 4 | 5 | 6 | 7 | ... | n |
|---|---|---|---|---|---|---|---|-----|---|
| 1 | 0 | 0 | 2 | 0 | 5 | 0 | 2 |     |   |
| 2 | 0 | 0 | 0 | 0 | 0 | 0 | 0 |     |   |
| 3 | 0 | 0 | 0 | 0 | 0 | 0 | 3 |     |   |
| 4 | 0 | 0 | 0 | 0 | 0 | 0 | 8 |     |   |
| 5 | 0 | 0 | 0 | 0 | 0 | 0 | 1 |     |   |
| 6 | 0 | 0 | 3 | 0 | 0 | 0 | 0 | ... |   |
| 7 | 0 | 0 | 0 | 0 | 0 | 0 | 0 |     |   |
| ... |  |   |   |   |   |   |   |     |   |
| n |   |   |   |   |   |   |   |     |   |

300

INFORMATION PROCESSING APPARATUS, INFORMATION PROCESSING METHOD, AND PROGRAM

This application is based upon and claims the benefit of priority of the prior Japanese Patent Application No. 2020-062302, filed on Mar. 31, 2020. The disclosure of the priority application is incorporated in its entirety herein by reference.

BACKGROUND OF THE INVENTION

(1) Field of the Invention

The present invention relates to an information processing apparatus, an information processing method, and a program.

(2) Description of Related Art

In a troubleshooting work in facilities of a network system or the like, a large number of alarms are generated from a large number of facilities. This may cause an alarm related to a root cause of a failure to be buried. To cope with this, Japanese Patent No. 3082548 discloses a system in which a plurality of alarms generated from a plurality of facilities are classified into groups for each alarm having a synchronousness, and an alarm closest to an occurrence event is selected for each group. In this system, correlations of facilities are learned from alarms of the other facilities that are synchronized with an alarm of one facility, correlated facilities are divided into groups, and learning is performed for each of the groups by a neural network, thereby speeding up the learning.

SUMMARY

However, in the technique of Japanese Patent No. 3082548, there is a problem in that it is necessary to learn the correlations of facilities in advance and it is impossible to learn an alarm alone.

The present invention has been made in view of such a problem, and an object of the present invention is to provide a technique for estimating a root cause based on a plurality of output signals output from devices to be managed.

In order to achieve the above object, an information processing apparatus of the present invention includes: a reception module configured to receive selection of an output signal corresponding to a root cause from a group including a plurality of output signals, the plurality of output signals being obtained from a plurality of devices to be managed and being obtained in a predetermined period; a replacement module configured to replace a selection result received by the reception module with a combination of the selection results in two output signals, the selection result being corresponding to the group, the two output signals being selected from the plurality of output signals; and a model generation module configured to generate a ranking model of the plurality of output signals based on the selection results after the replacement.

In addition, another aspect is an information processing apparatus including: an acquisition module configured to acquire a plurality of first output signals that are estimation targets for a root cause; and an estimation module configured to estimate a first output signals that is a root cause from among the plurality of first output signals that are estimation targets for a root cause based on a ranking model generated by replacing a selection result of a second output signal that is a root cause in a group including a plurality of second output signals obtained in a predetermined period of time with a combination of selection results in two output signals selected from among the group.

In addition, another aspect is an information processing method executed by an information processing apparatus, the information processing method including: a reception step of receiving selection of an output signal corresponding to a root cause from a group including a plurality of output signals, the plurality of output signals being obtained from a plurality of devices to be managed and being obtained in a predetermined period; a replacement step of replacing a selection result received by the reception module with a combination of the selection results in two output signals, the selection result being corresponding to the group, the two output signals being selected from the plurality of output signals; and a model generation step of generating a ranking model of the output signal based on the selection results after the replacement.

In addition, another aspect is an information processing method executed by an information processing apparatus, the information processing method including: an acquisition step of acquiring a plurality of first output signals that are estimation targets for a root cause; and an estimation step of estimating a first output signals that is a root cause from among the plurality of first output signals that are estimation targets for a root cause based on a ranking model generated by replacing a selection result of a second output signal that is a root cause in a group including a plurality of second output signals obtained in a predetermined period of time with a combination of selection results in two output signals selected from among the group.

In addition, another aspect is a non-transitory computer-readable storage medium storing a program for causing a computer to execute a method for processing information, the method including: a reception step of receiving selection of an output signal corresponding to a root cause from a group including a plurality of output signals, the plurality of output signals being obtained from a plurality of devices to be managed and being obtained in a predetermined period; a replacement step of replacing a selection result received by the reception module with a combination of the selection results in two output signals, the selection result being corresponding to the group, the two output signals being selected from the plurality of output signals; and a model generation step of generating a ranking model of the output signal based on the selection results after the replacement.

In addition, another aspect is a non-transitory computer-readable storage medium storing a program for causing a computer to execute a method for processing information, the method including: an acquisition step of acquiring a plurality of first output signals that are estimation targets for a root cause; and an estimation step of estimating a first output signals that is a root cause from among the plurality of first output signals that are estimation targets for a root cause based on a ranking model generated by replacing a selection result of a second output signal that is a root cause in a group including a plurality of second output signals obtained in a predetermined period of time with a combination of selection results in two output signals selected from among the group.

According to the present invention, it is possible to estimate a root cause based on a plurality of output signals output from devices to be managed.

BRIEF DESCRIPTION OF THE DRAWINGS

FIG. 2 is a diagram showing an example of a data configuration of a history table;

FIG. 3 is a diagram showing a ranking model;

DETAILED DESCRIPTION OF PREFERRED EMBODIMENTS

Herein, an embodiment of the present invention will be described in the following order.

(1) Problem of ranking:
(2) Configuration of information processing apparatus:
(3) Information processing:
(4) Supplement:

(1) Problem of Ranking

Figure 9:
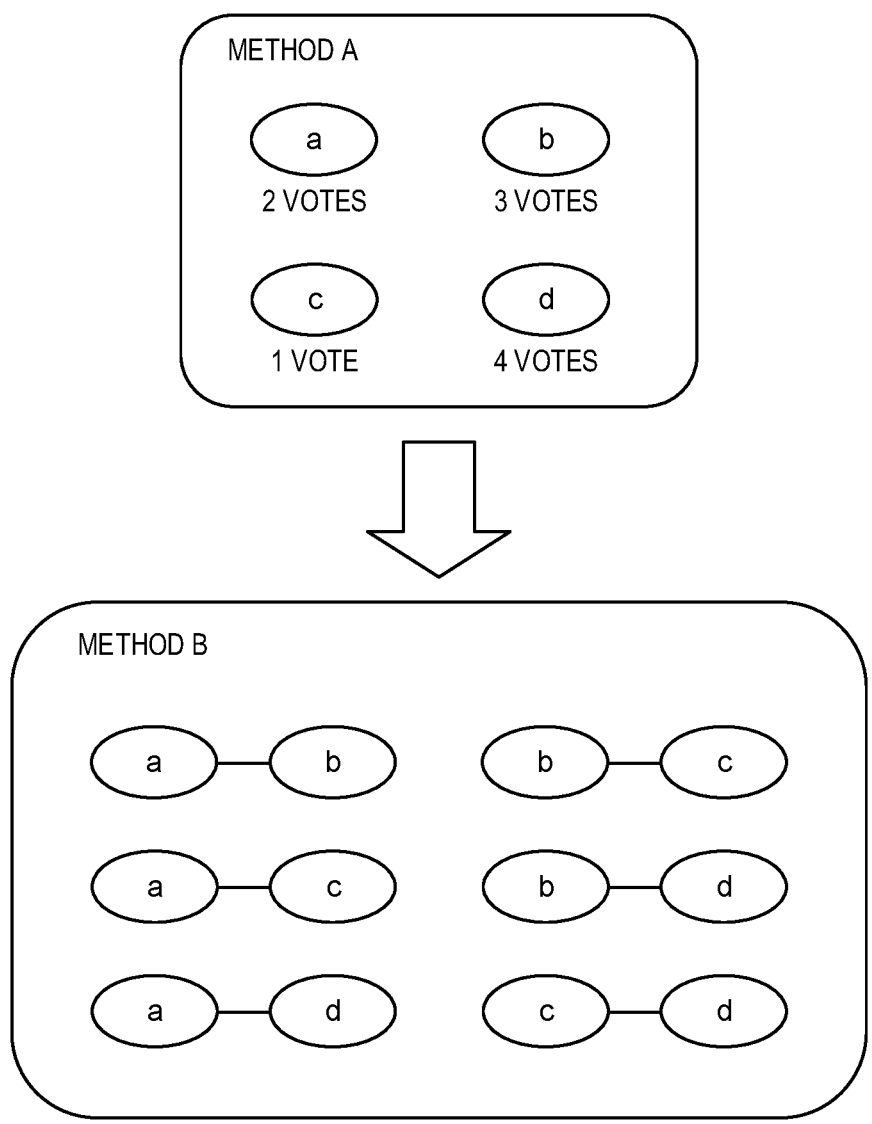
FIG. 9 is an explanatory diagram of methods of a popularity vote.

First, prior to description of an information processing apparatus according to an embodiment, a problem of ranking candidates from a result of a popularity vote will be described. Here, a popularity vote of four candidates from a to d will be described as an example. In a method in which the most favorite candidate is voted for as a method A shown in the upper part of FIG. 9, there are problems in which a rank of a candidate who is not seen by voters cannot be higher and a rank of a candidate who is not seen cannot be evaluated correctly. On the other hand, in a method in which candidates are ranked based on a questionnaire such as which of two people you like as in a method B shown in the lower part of FIG. 9, it is possible to rank even lower-ranked candidates. The problem of performing ranking from the result of the method B can boil down to a so-called linear ordering problem. For the linear ordering problem, the following document can be referred to.

Figure 10:
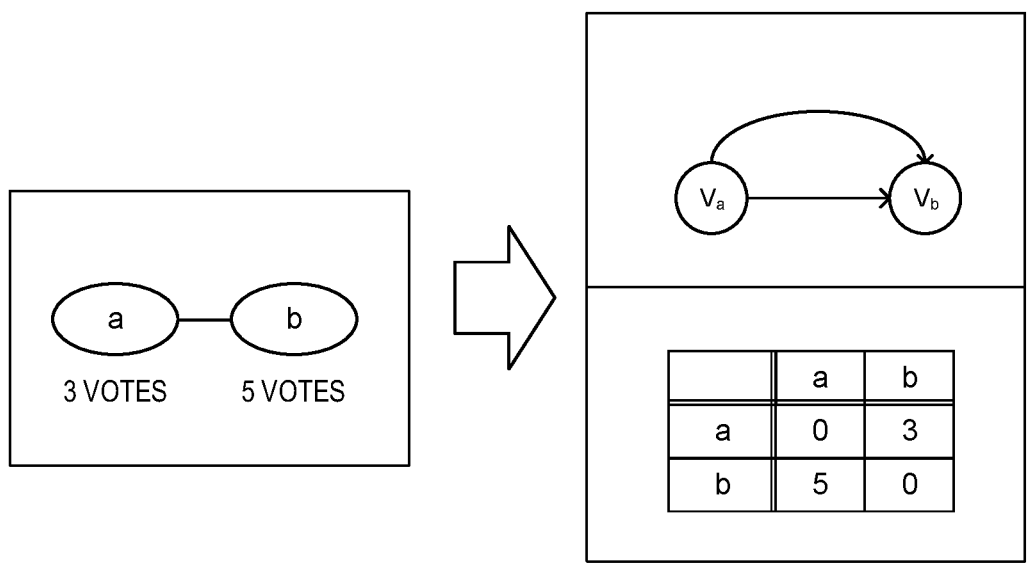
FIG. 10 is a diagram showing a directed graph and a matrix corresponding thereto.

"Solution of Linear Ordering Problems" Operations Research http://www.orsj.or.jp/archive2/or57-06/or57_6_327.pdf Next, consider that a linear ranking problem is put into a directed graph. To simplify the problem, as shown on the left of FIG. 10, a case will be described as an example, in which as a result of asking about which of a and b you like, a result in which a gains 3 votes and b gains 5 votes is obtained. A directed graph showing this result is shown in the upper right part of FIG. 10. The lower right part of FIG. 10 shows a matrix showing this result. In the matrix, candidates are arranged in order from left to right, and in the column direction (vertical direction), candidates are arranged in the same order as in the horizontal direction from top to bottom. There is no comparison between a and b, and thus the value of Vi(i, i) in the matrix is 0.

Figure 11:
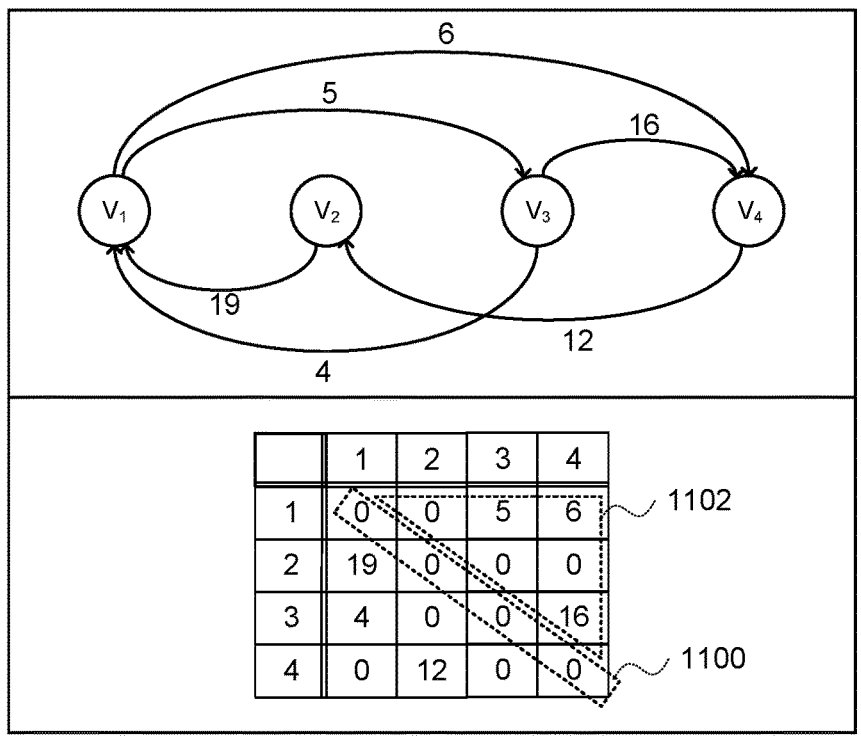
FIG. 11 is an explanatory diagram of processing for obtaining an optimum solution.
Figure 11:
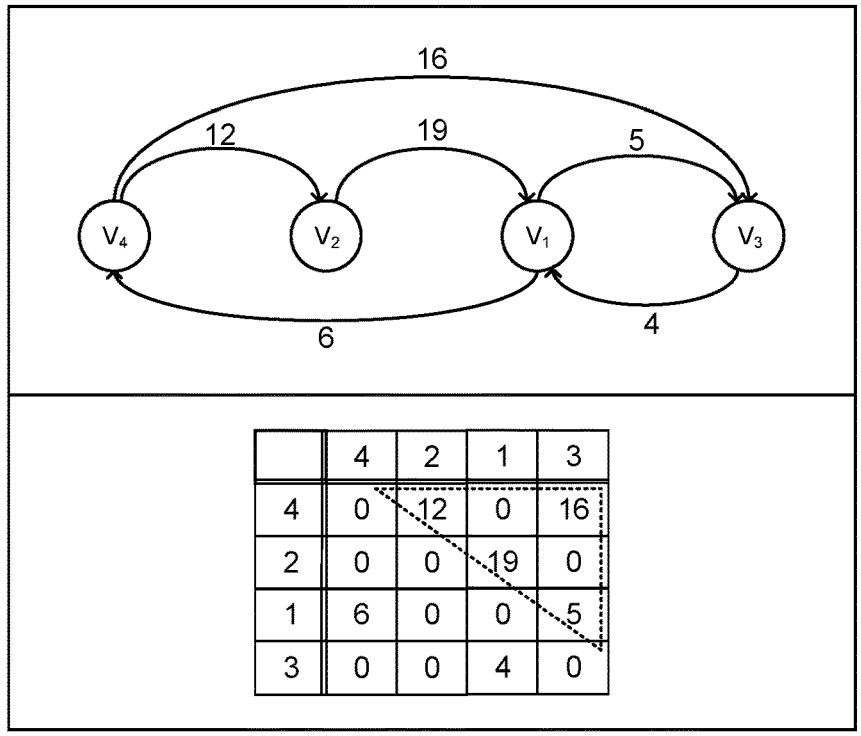

Similarly, consider a case where there are four candidates, $V_1$, $V_2$, $V_3$, and $V_4$ and results of alternative selection are obtained. As shown in the upper part of FIG. 11, first, the candidates are arranged in the arrangement order of candidate indexes to create a directed graph and a matrix. Then, a value of an upper triangle is calculated. Here, the value of the upper triangle is a sum of components 1102 above diagonal components 1100 as shown in the upper part of FIG. 11. In the example of FIG. 11, the value of the upper triangle is 5+6+16, which is 27.

By changing an index order, the value of the upper triangle changes. Among values of upper triangles having different index orders, an arrangement order of indexes in which a value of an upper triangle is maximized is obtained as an optimum solution. That is, the index order in which the value of the upper triangle is maximized is obtained as a popularity order. In the example of FIG. 11, as shown in the lower part of FIG. 11, it is assumed that the value of the upper triangle is maximized in the arrangement order of the indexes of $V_4$, $V_2$, $V_1$, and $V_3$. In this case, the index order of $V_4$, $V_2$, $V_1$, and $V_3$ is obtained as the optimum solution.

However, in order to find the arrangement order of indexes in which the value of the upper triangle is maximized, it is necessary to find values of upper triangles of all arrangement orders that the indexes can take. If there are n (n is a natural number) indexes, there are n! arrangement orders. That is, combinations of indexes increase in exponential order as the number of indexes increases. In this way, calculation for searching for the arrangement order of indexes is NP-hard, and the amount of calculation becomes enormous.

Accordingly, it is considered to apply a heuristic technique to solve the problem in polynomial time, although there is no guarantee of the optimum solution. Here, heuristics is a solution that is empirically known to be correct. In the present embodiment, one index out of a plurality of indexes to be ranked is extracted as a processing target. Then, in an arrangement order of indexes, a rank of the index of the processing target is changed, and the value of the upper triangle for each of a plurality of arrangement orders thus obtained is calculated. This operation is performed for all indexes to find an arrangement order in which the value of the upper triangle is maximized.

Figure 4:
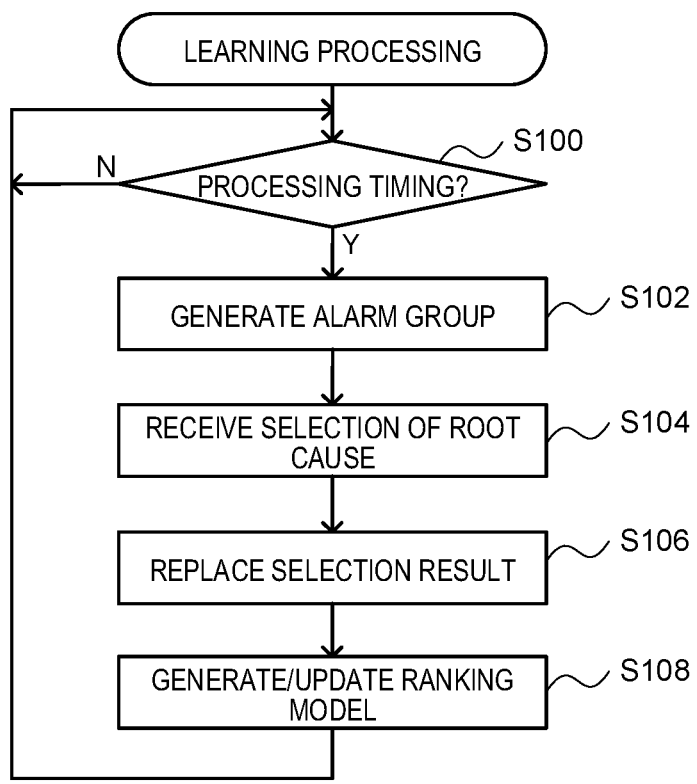
FIG. 4 is a flowchart showing learning processing.
Figure 12:
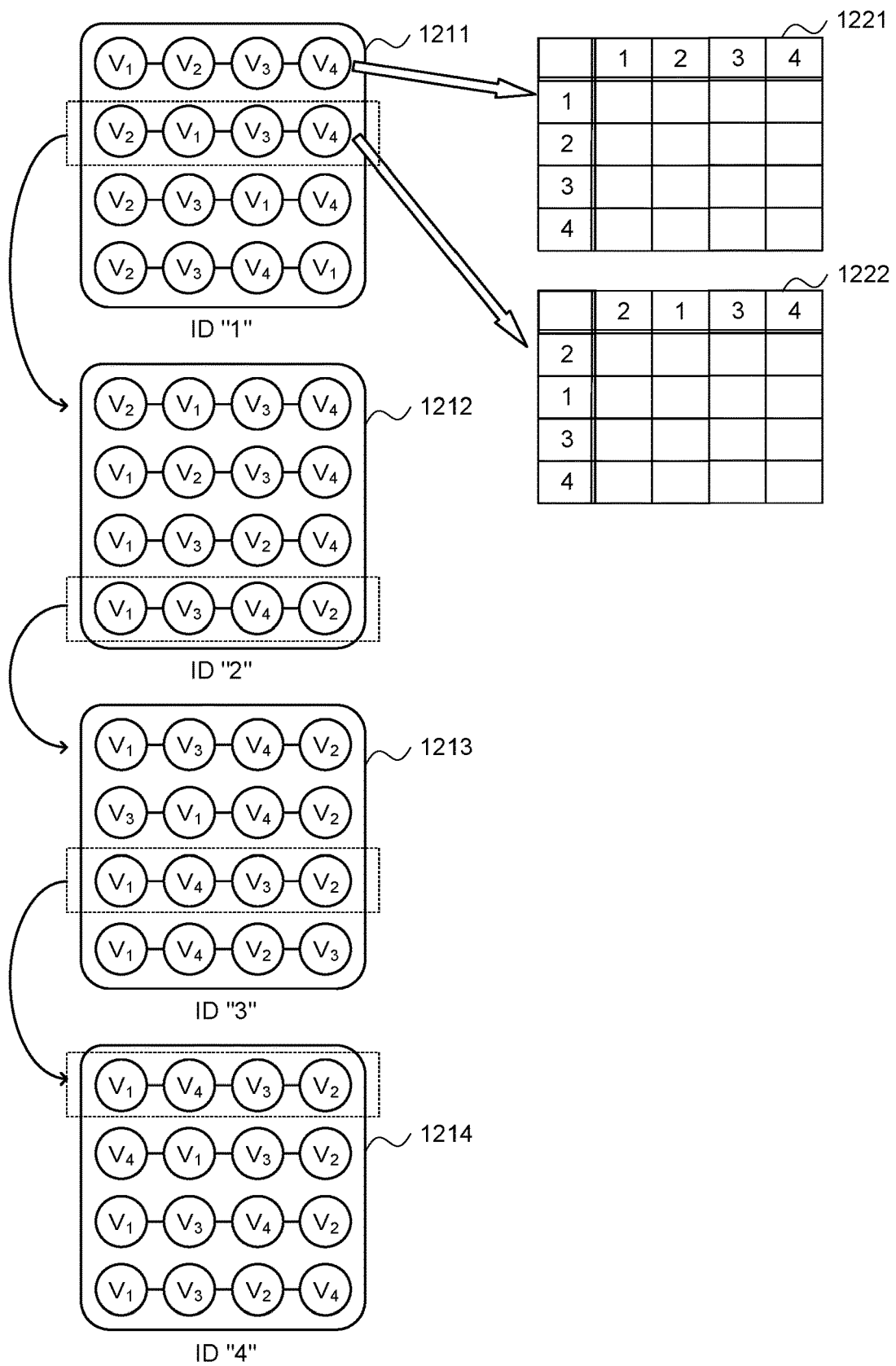
FIG. 12 is an explanatory diagram of processing for generating an arrangement order.

For example, for four candidates, as shown in the upper left of FIG. 12, the arrangement order of "$V_1$, $V_2$, $V_3$, $V_4$" which is an ascending order of index IDs is first set as an initial solution. Here, the index ID "1" is extracted to as a processing target, and the rank of the index ID "1" is changed one by one. As a result, a provisional solution space 1211 for an ID "1" is obtained. In the provisional solution space 1211, arrangement orders of "$V_1$, $V_2$, $V_3$, $V_4$", "$V_2$, $V_1$, $V_3$, $V_4$", "$V_2$, $V_3$, $V_1$, $V_4$" and "$V_2$, $V_3$, $V_4$, $V_1$" are included. Matrices 1221, 1222 shown on the right side of FIG. 4 are matrices corresponding to the arrangement orders of "$V_1$, $V_2$, $V_3$, $V_4$" and "$V_2$, $V_1$, $V_3$, $V_4$", respectively.

Values of upper triangles corresponding to the respective four arrangement orders included in the provisional solution space 1211 for the ID "1" are calculated, and an arrangement order in which the value of the upper triangle is maximized is obtained as a provisional solution in the provisional solution space corresponding to the index ID "1". Here, it is assumed that "$V_2$, $V_1$, $V_3$, $V_4$" is obtained as the provisional solution.

Next, as shown in the second stage on the left side of FIG. 12, the index ID "2" is extracted as the processing target from the optimum solution "$V_2$, $V_1$, $V_3$, $V_4$" of the provisional solution space 1211 for the ID "1", and the rank of the index ID "2" is changed one by one. As a result, a provisional solution space 1212 for an ID "2" is obtained. A provisional solution in the provisional solution space 1212 for the ID "2" is obtained from values of upper triangles corresponding to the respective four arrangement orders included in the provisional solution space 1212 for the ID "2". Similarly, provisional solutions in a provisional solution space 1213 for an ID "3" and a provisional solution space 1214 for an ID "4" are obtained. Then, an arrangement order in which the value of the upper triangle is maximized among the four provisional solutions is obtained as the optimum solution.

In this way, by changing the rank of each index one by one, the number of arrangement orders of indexes can be lowered from 4! to $4^2$. The above technique can be generalized, and the information processing apparatus according to the present embodiment is obtained by applying the above technique. The information processing apparatus will be hereinafter described.

Figure 1:
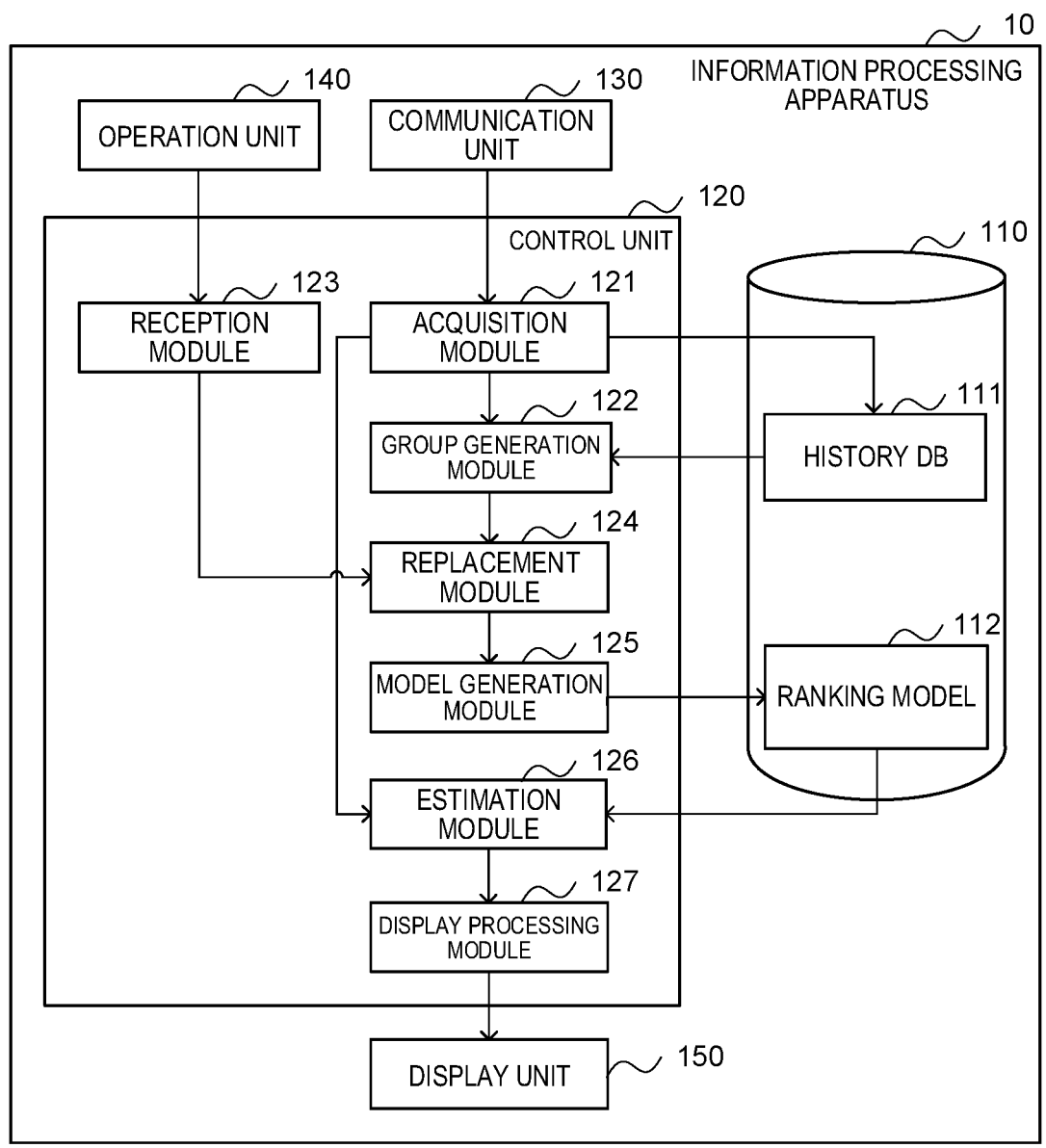
FIG. 1 is a diagram showing a configuration of an information processing apparatus.

(2) Configuration of information processing apparatus:

FIG. 1 is an overall configuration diagram of an information processing apparatus 10. The information processing apparatus 10 manages a large number of network devices, and when an abnormality occurs in a network device, the information processing apparatus 10 receives an alarm from the network device in which the abnormality has occurred. That is, the alarm is information indicating that an abnormality has occurred. It is assumed that the alarm includes a time of occurrence of the abnormality, an alarm classification, an alarm ID, and an alarm name. Here, the alarm classification is information indicating a type of the alarm. The alarm ID is identification information for identifying the alarm. The alarm name is information indicating a content of the alarm. The alarm is an example of an output signal. Further, although it is assumed that the alarm ID is assigned by a network device, as another example, the information processing apparatus 10 may assign the alarm ID, and as still another example, another apparatus such as a monitoring server that monitors the network device may assign the alarm ID.

The information processing apparatus 10 includes a control unit 120 including a CPU, a RAM, a ROM, and the like, a recording medium 110, a communication unit 130, an operation unit 140, and a display unit 150. The control unit 120 executes various programs stored in the recording medium 110 and the ROM to control the entire information processing apparatus 10. The recording medium 110 stores various data and programs. The communication unit 130 communicates with an external apparatus via a network by wire or wirelessly. Specifically, the communication unit 130 communicates with network devices to be managed by the information processing apparatus 10. The operation unit 140 receives a user operation. The display unit 150 displays various data.

A history DB 111 and a ranking model 112 are stored in the recording medium 110. FIG. 2 is a diagram showing an example of a data configuration of the history DB 111. Alarms are stored in the history DB 111 in chronological order. In the history DB 111, an alarm is stored in association with a record number. Further, each record is associated with a flag. Here, the record number is identification information of the record. A default value of the flag is set to off. The flag will be described later.

Each time the control unit 120 receives an alarm from a network device, the history DB 111 stores the alarm in association with the record number. In the initial state, no record is stored in the history DB 111.

The ranking model 112 is a model referred to for identifying an alarm corresponding to a root cause from among a plurality of alarms obtained within a predetermined period of time. The root cause is a root cause for which a plurality of alarms have been generated. For example, when a failure occurs in a network device A and alarms are generated from network devices A to C due to the failure, the alarm of the network device A among the alarms of the network devices A to C is the root cause. The ranking model 112 is information generated by learning processing by the control unit 120 of the information processing apparatus 10 and registered in the recording medium 110. That is, the ranking model 112 is not stored in a state before the learning processing is performed. The ranking model will be described later.

With reference to FIG. 1 again, the control unit 120 includes an acquisition module 121, a group generation module 122, a reception module 123, a replacement module 124, a model generation module 125, an estimation module 126, and a display processing module 127 as functional components. The acquisition module 121, the group generation module 122, the reception module 123, the replacement module 124, the model generation module 125, the estimation module 126, and the display processing module 127 are realized by the CPU executing an information processing program. That is, the information processing program is a program for causing the control unit 120 as a computer of the information processing apparatus 10 to function as the functional units. Hereinafter, each functional component will be described.

The control unit 120 receives (acquires) alarms from a plurality of network devices via the communication unit 130, and saves the received alarms in the history DB 111 by the function of the acquisition module 121. The control unit 120 generates an alarm group including a plurality of alarms by the function of the group generation module 122. Specifically, the control unit 120 generates a group of a plurality of alarms obtained within a predetermined period as an alarm group based on the times of occurrence indicated by the alarms. For example, as shown in FIG. 2, the control unit 120 generates a group of a plurality of alarms generated in the period from 0:00 to 0:20 as a first alarm group 211. The control unit 120 further generates a group of a plurality of alarms generated in the period from 0:20 to 0:40 as a second alarm group 212. In this way, the control unit 120 groups a plurality of alarms generated in a predetermined period into one alarm group.

The control unit 120 receives a user operation by the function of the reception module 123. For example, the control unit 120 receives selection of an alarm that is the root cause from among a plurality of alarms included in each alarm group obtained by the group generation module 122. When a plurality of alarms are generated within a certain period of time, it is considered that these alarms are not generated due to different causes but are caused by one fundamental cause, that is, the root cause. The control unit 120 receives selection of such a root cause.

The control unit 120 replaces selection results for each alarm group with a combination of results of alternative selection by the function of the replacement module 124. The combination of results of alternative selection is a combination of selection results in two alarms selected from among a plurality of alarms included in the alarm group. This processing is equivalent to replacing the selection result of the method A in FIG. 9 with the selection result of the method B. When a root cause is selected from an alarm group, a low rank can be estimated for an alarm which occurs infrequently but is important. Accordingly, a solution of "ranking by alternative selection" is applied to a problem of "selecting one from many items (extracting the root cause)".

The control unit 120 generates a ranking model of alarms to be managed by the function of the model generation module 125. The control unit 120 performs the following processing by the function of the model generation module 125. The control unit 120 sets an arrangement order of a plurality of alarms included in an alarm group as an arrangement order of each of a row and a column, and generates a matrix having selection results in two alarms obtained by the function of the replacement module 124 as values of components corresponding to ranks of the two alarms. The number of each of rows and columns in the generated matrix is equal to the number of alarm IDs. Then, the control unit 120 generates a ranking model by solving the problem of maximizing the value of the upper triangle.

First, processing of generating a matrix will be described. The control unit 120 adds 1 to an (i, j)th component of a matrix corresponding to a combination of an alarm i which is the root cause and an alarm j which is not the root cause.

For example, consider a case where an alarm with an alarm ID "6" is selected as the root cause in the first alarm group 211, that is, a network device corresponding to the alarm ID "6" is selected as the root cause. In this case, a row vector shown in (Equation 1) is obtained as a feature quantity of the alarm with the alarm ID "6".

$$V_{6j}=(1,1,1,1,1,0,1,\ldots)$$ (Equation 1)

Here, the first element of $V_{6j}$ corresponds to a set of the alarm with the alarm ID "1" and the alarm with the alarm ID "6". The alarm with the alarm ID "6" is selected as the root cause in this set, and thus the first element is "1". Similarly, the 2nd to 5th elements and the 7th element are 1. The sixth element is a combination of alarms corresponding to the alarm ID "6", which is not assumed, and thus is "0". In addition, superiority cannot be determined between an alarm not included in the first alarm group 211 and the alarm with the alarm ID "6". Accordingly, although not shown in (Equation 1), an element corresponding to a set of an alarm not included in the first alarm group 211 and the alarm with the alarm ID "6" is "0". As a result, when there are a large number of network devices, the row vector is a vector including many zeros.

The control unit 120 adds a row vector corresponding to a combination of alternative replacement results thus obtained to the matrix. For example, when the row vector of (Equation 1) is added to a matrix 300 as shown in FIG. 3, values of components in the 6th row are "1,1,4,1,1, 0,1 . . . ". The control unit 120 sets a plurality of alarm groups obtained in a predetermined period such as one day as processing targets, generates a row vector corresponding to each alarm group, and adds the value of the row vector to the corresponding component of the matrix.

Next, processing of solving a problem of maximizing the value of the upper triangle will be described. The control unit 120 solves a linear ordering problem to generate a ranking model. That is, the control unit 120 obtains an arrangement order in which the value of the upper triangle of a matrix is maximized as the optimum solution and consider the arrangement order as a ranking model. However, as explained in (1) Problem of ranking, when the value of the upper triangle is to be obtained for all the arrangement orders, it is necessary to calculate the value of the upper triangle for n! arrangement orders. However, in some cases, there are tens of thousands to hundreds of thousands network devices managed by the information processing apparatus 10. Thus, it is NP-hard to calculate the value of the upper triangle for n! arrangement orders, and the amount of calculation becomes enormous. Accordingly, the control unit 120 of the present embodiment applies a heuristic method to solve the problem in polynomial time.

First, as shown in FIG. 3, the control unit 120 sets the arrangement order of alarm IDs in ascending order as an initial solution, and obtains the value of the upper triangle corresponding to this initial solution. Further, the control unit 120 extracts the alarm IDs one by one as the processing target, as described with reference to FIG. 12. The control unit 120 first extracts the alarm ID "1" as the processing target, and changes the rank of the alarm ID of the processing target one by one. As a result, when there are n devices to be managed, n different arrangement orders are obtained. The control unit 120 identifies an arrangement order in which the value of the upper triangle of the corresponding matrix is maximized as a provisional solution from among the n arrangement orders. Further, the control unit 120 also extracts the next alarm ID "2" as the processing target, sets the provisional solution of the alarm ID "1" as an initial state, and changes the rank of the alarm ID "2" one by one to generate n arrangement orders. Then, the control unit 120 identifies the arrangement order in which the value of the upper triangle of the corresponding matrix is maximized as a provisional solution from among the n arrangement orders. The control unit 120 performs this processing for all alarm IDs, and generates an arrangement order corresponding to a matrix in which the value of the upper triangle is maximized as a ranking model. In this way, a ranking model in which an alarm that is more likely to be a root cause is more highly ranked is generated.

As described above, in the above processing, n alarm IDs are extracted as the processing targets and n arrangement orders are obtained for each ID, so that $n^2$ matrices are obtained in total. That is, the amount of calculation can be reduced from n! to $n^2$.

The control unit 120 refers to the ranking model 112 and performs estimation processing of estimating an alarm that is the root cause for an alarm group of an estimation target, by the function of the estimation module 126. The estimation processing is processing executed after the ranking model 112 is generated by the learning processing. Specifically, the control unit 120 refers to the arrangement order of alarms shown in the ranking model 112, and estimates the most highly-ranked alarm among the alarms included in the alarm group of the estimation target as the root cause. The control unit 120 performs control such that various pieces of information are displayed on the display unit 150 by the function of the display processing module 127.

(3) Information processing:

FIG. 4 is a flowchart showing the learning processing by the control unit 120. It is assumed that each time an abnormality occurs in a network device to be managed, the control unit 120 receives an alarm from the network device in which the abnormality occurs, and accumulates the alarm in the history DB 111.

The control unit 120 determines whether or not the processing timing of the learning processing has come (step S100). It is assumed that the processing timing is midnight every day. The processing timing may be any time as long as it is a timing at which a certain period of time has elapsed, and is not limited to the embodiment. As another example, the processing timing may come at 12-hour intervals or 48-hour intervals. The control unit 120 waits until the processing timing (N in step S100), and when the processing timing comes (Y in step S100), generates an alarm group (step S102). In the history DB 111, the control unit 120 sets alarms for one day accumulated after the previous processing timing as a processing target, and generates a plurality of groups by considering 20 minutes as one group.

Next, the control unit 120 receives selection of an alarm of the root cause for each alarm group (step S104). When an alarm of the root cause is selected, the control unit 120 turns on a flag of a record corresponding to the selected alarm. For example, in the first alarm group 211 shown in FIG. 2, when the alarm with alarm ID "6" is selected as the root cause, as shown in FIG. 2, flag-on is recorded in association with the alarm with alarm ID "6".

Next, the control unit 120 replaces selection results in each alarm group with results of alternative selection (step S106). Next, the control unit 120 generates a ranking model in accordance with the results of alternative selection (step S108). Specifically, the control unit 120 first generates a row vector for the alarm selected as the root cause. In the row vector, the elements corresponding to pairs of the alarms that belong to the same alarm group are 1, and the other elements are 0. The control unit 120 generates row vectors corresponding to all alarm groups for which alarm selection has been received in S104, and adds values of all the row vectors to corresponding elements of a matrix.

Then, the control unit 120 generates a plurality of arrangement orders by rearranging the arrangement order of alarms by the method described with reference to FIG. 4, obtains values of upper triangles in the arrangement orders, and uses the arrangement order in which the value of the upper triangle is maximized to generate a ranking model.

Further, at the time of processing in step S108, the ranking model 112 may have already been stored in the recording medium 110. In this case, in step S108, the control unit 120 adds a value of a newly obtained row vector to a matrix corresponding to the already generated ranking model. Then, the control unit 120 again generates a plurality of arrangement orders of alarms, identifies the arrangement order in which the value of the upper triangle is maximized, and updates the ranking model 112 to the newly obtained arrangement order. After that, the control unit 120 repeats the processing of steps S102 to S108 every time the processing timing comes, and continues to update the ranking model.

As described above, the information processing apparatus 10 according to the present embodiment uses an alarm of a root cause selected in accordance with a user operation from an alarm group including alarms actually obtained in network devices to be managed as teacher data, so that a ranking model can be generated. Further, the information processing apparatus 10 converts a selection result in an alarm group into a result of alternative selection and solves the linear ranking problem of the result of alternative selection, so that a ranking model can be generated. In addition, the information processing apparatus 10 can efficiently generate an appropriate ranking model by applying the heuristic method in solving the linear ranking problem.

Figure 5:
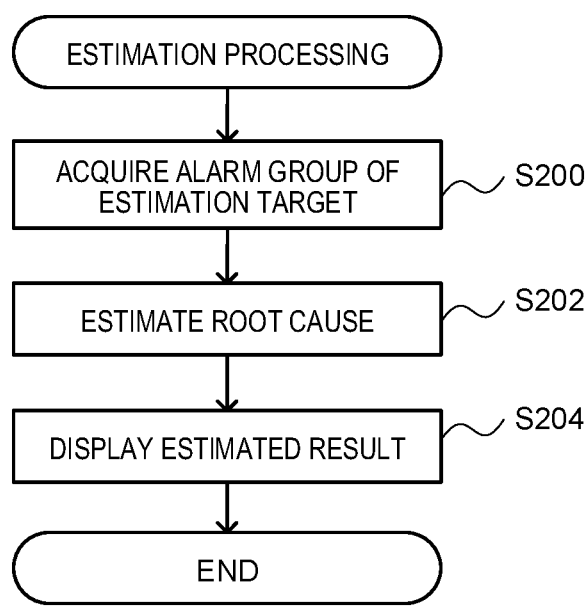
FIG. 5 is a flowchart showing estimation processing.

FIG. 5 is a flowchart showing estimation processing by the control unit 120. The estimation processing is processing executed after the ranking model 112 is generated by the learning processing and stored in the recording medium 110. The control unit 120 first acquires an alarm group of an estimation target by the function of the acquisition module 121 (step S200). For example, the control unit 120 acquires a group of a plurality of alarms included in 20 minutes as a processing unit in the learning processing as an alarm group of an estimation target.

Next, the control unit 120 refers to the ranking model 112, and estimates, among the plurality of alarms included in the alarm group of the estimation target, the alarm that is positioned at the highest rank in the ranking model 112 as the root cause, by the function of the estimation module 126 (step S202). Next, the control unit 120 performs controlling such that the estimation result is displayed on the display unit 150 by the function of the display processing module 127 (step S204). This completes the estimation processing.

As described above, in the estimation processing, by referring to the ranking model, it is possible to efficiently estimate an alarm that is the root cause in an alarm group including a plurality of alarms.

After the ranking model 112 is generated, the control unit 120 may use all the alarm groups generated in step S102 as the alarm groups of the estimation target at the processing timing of the learning processing to estimate the root cause. Further, the control unit 120 receives selection of a correct root cause in the learning processing to sequentially update the ranking model.

As described above, in the information processing apparatus 10 according to the embodiment, a selection result of the root cause in an alarm group including three or more alarms is replaced with a combination of results of alternative selection. Then, the information processing apparatus 10 further solves the problem of ranking alarms from the results of alternative selection as a linear ranking problem by the heuristic method to generate a ranking model of alarms. Furthermore, in the ranking model, the arrangement order of all network devices to be managed is defined, so that it is possible to estimate the root cause simply by referring to the ranking model without considering the correlation between the network devices.

As described above, the information processing apparatus 10 of the present embodiment estimates a correlation between network devices without learning the mutual relationship between the network devices in advance, so that a ranking model in which a certain certainty is guaranteed can be generated. Accordingly, even when the number of network devices to be managed is large, it is possible to generate a ranking model without requiring an operation such as setting a correlation by a user such as an administrator. That is, the information processing apparatus 10 can estimate a root cause based on a plurality of alarms (output signals) output from devices to be managed.

(4) Supplement:

The above embodiment is an example for carrying out the present invention, and various other embodiments can be adopted.

As a first modified example, a part of the functions of the information processing apparatus 10 may be a system realized by a plurality of apparatuses. In addition, some components of the above-described embodiment may be omitted, and the order of processing may be changed or omitted. For example, in the learning processing, the group generation processing (step S102) may be executed every time a period (20 minutes in the embodiment) as a unit of the group elapses to group a plurality of alarms.

Further, as another example, the information processing apparatus described in the embodiment may be realized by two apparatuses, a learning apparatus that performs learning processing and an estimation apparatus that performs estimation processing. In this case, it is assumed that the learning apparatus includes components other than the estimation module 126 in the configuration of the information processing apparatus 10 described with reference to FIG. 1. Further, it is assumed that the estimation apparatus includes the same hardware (recording medium, control unit, communication unit, operation unit, and display unit) as the information processing apparatus 10 described with reference to FIG. 1, and includes an acquisition module for acquiring an alarm of an estimation target, an estimation module, and a display processing module as functions of the control unit. Further, it is assumed that a ranking model generated by the learning apparatus is stored in the storage medium of the estimation apparatus.

Figure 6:
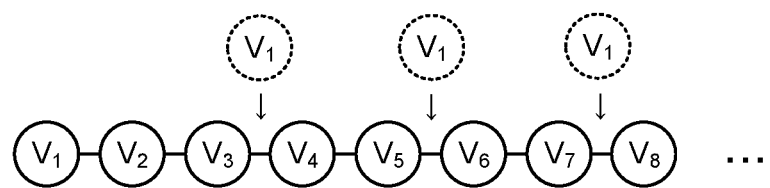
FIG. 6 is an explanatory diagram of a first modified example.

A second modified example will be described. Although in the embodiment, the control unit 120 changes the rank of the alarm ID of the processing target one by one when generating a ranking model, the rank only need be changed at regular intervals, and the interval is not limited to one. For example, as shown in FIG. 6, the control unit 120 may change the rank of the alarm of the processing target (alarm ID "1") every other one. As a result, the rank of the alarm of the processing target becomes 1, 3, 5 . . . In this case, the number of generated arrangement orders is n*(n/2).

Further, as another example, the control unit 120 only need process a predetermined number of alarms, and does not have to process all alarms. For example, the control unit 120 may use n alarms for every other one, that is, n/2 alarms as processing targets to perform the processing described in the embodiment. In this case as well, the number of arrangement orders is n*(n/2).

Figure 7:
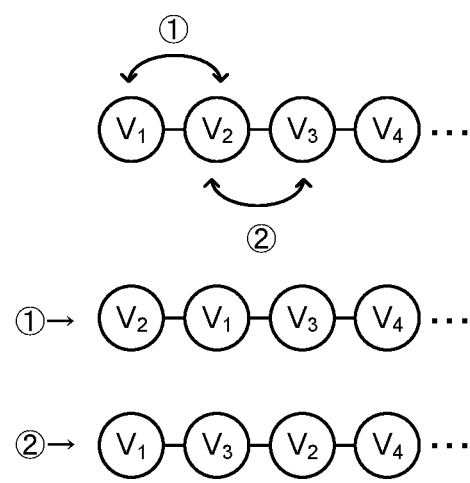
FIG. 7 is an explanatory diagram of the first modified example.

In this way, the control unit 120 only need generate an arrangement order in accordance with a condition under which a calculation amount for generating arrangement orders for n alarm IDs is reduced from the order of n! to the order of $O(n^2)$, and a condition for that is not limited to that of the embodiment. As yet another example, as shown in FIG. 7, two adjacent ranks may be exchanged to generate a plurality of arrangement orders. The number of alarms of processing targets can be arbitrarily determined depending on an accuracy of a ranking model desired by an administrator or the like.

Further, when the number of network devices to be managed is small, the control unit 120 may generate n! arrangement orders for n network devices without using the heuristic method and then generate a ranking model.

Figure 8:
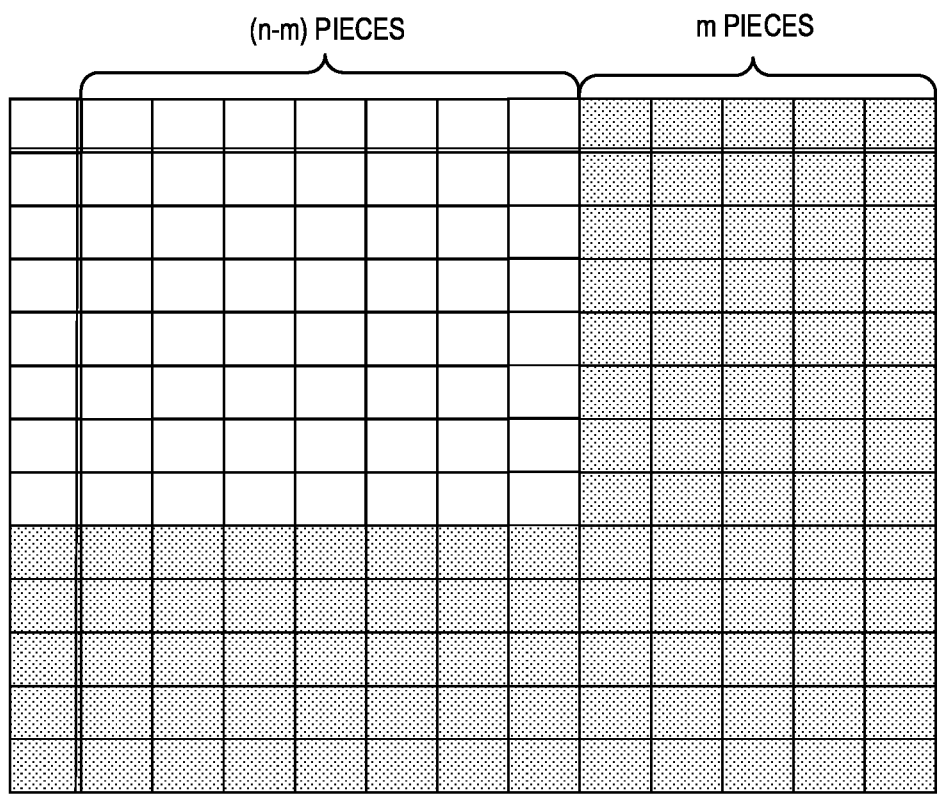
FIG. 8 is an explanatory diagram of a second modified example.

A third modified example will be described. In network devices, tens of thousands to hundreds of thousands alarms are generated, but what is a root cause is often 100 to 1000 alarms. Accordingly, the control unit 120 fixes a rank of an alarm ID that has never been selected as a root cause in generating a ranking model to a rank lower than that of an alarm ID that has been selected as the root cause. For example, it is assumed that of n alarm IDs, m (m is a natural number smaller than n) alarms have never been selected as the root cause. In this case, as shown in FIG. 8, the control unit 120 fixes the ranks of these m alarms to the (n−m+1)th to the nth. Then, the control unit 120 exchanges ranks among the first to the (n-m)th to generate a ranking model. As a result, it is possible to obtain a ranking model closer to an optimum solution while reducing the amount of calculation. Of alarms that have never been selected as the root cause, ranks of at least some of the alarms only need be fixed to ranks lower than those of alarms that have been selected, and ranks of all alarms need not be fixed to lower ranks.

As a fourth modified example, in the present embodiment, the management target is a network device, but a device to be managed only need be a device that outputs an alarm and is not limited to the network device.

As a fifth modified example, information received by the information processing apparatus only need be an output signal indicating deviation from a normal state, and is not limited to an alarm indicating an abnormality.

As a sixth modified example, there may be two or more root causes. Furthermore, when there are a plurality of root causes, a value to be added in a matrix may be set as a stepwise value, for example, "2" is given to a root cause with high importance and "1" is given to a root cause with low importance. Further, the information processing apparatus 10 may estimate a plurality of alarms that are the root causes in accordance with the ranks in the ranking model in the estimation processing. Further, in this case, the information processing apparatus 10 may estimate a plurality of alarms as the root causes together with certainty in accordance with the ranks and display them.

As a seventh modified example, the information processing apparatus 10 may receive alarms grouped by another apparatus as learning data and generate a ranking model based on the learning data. In this case, the information processing apparatus does not have to include the group generation module.

As an eighth modified example, the information processing apparatus 10 only need generate a ranking model based on not only alarms but also output signals output from devices to be managed. For example, the information processing apparatus 10 monitors temperature sensors installed at different locations in a monitoring area. In addition, when a detected value is a value in a normal state that is not determined to be an abnormal state but in a temperature range that requires attention, each of the temperature sensors outputs an output signal. In this case, the information processing apparatus 10 can generate an estimation model for estimating a root cause corresponding to the detection of the value in the temperature range that requires attention.

Further, as another example, a temperature sensor monitored by the information processing apparatus 10 periodically transmits an output signal indicating a temperature to the information processing apparatus 10. Then, the information processing apparatus 10 may set thresholds for output signals of temperature sensors (target devices) to generate, based on a group of output signals of the thresholds or greater obtained in a predetermined period of time, an estimation model for estimating a root cause of these output signals of the thresholds or greater. As described above, the information processing apparatus 10 can generate an estimation model for estimating a root cause of occurrence of not only an abnormal state but also a predetermined state.

Further, the above-mentioned apparatus, program, and method may be realized as a single apparatus or may be realized by a plurality of apparatuses using shared parts, and various aspects are included in the present invention. In addition, appropriate modification is possible, as some of them are software and some of them are hardware. Further, the invention is also established as a recording medium of a program that controls an apparatus. Of course, the recording medium of the program may be a magnetic recording medium or a semiconductor memory, and any recording medium to be developed in the future can be considered in exactly the same way.

This application claims the benefit of Japanese Patent Application No. 2020-62302, filed Mar. 31 2020, which is hereby incorporated by reference herein its entirety.

What is claimed is:

1. An information processing apparatus comprising:
a reception module configured to receive selection of an output signal corresponding to a root cause from a group including a plurality of output signals, the plurality of output signals being obtained from a plurality of devices to be managed and being obtained in a predetermined period;

a replacement module configured to replace a selection result received by the reception module with a combination of the selection results in two output signals, the selection result being corresponding to the group, the two output signals being selected from the plurality of output signals; and a model generation module configured to generate a ranking model of the plurality of output signals based on the selection results after the replacement;

wherein the model generation module sets an arrangement order of the plurality of output signals as an arrangement order of each of a row and a column, generates a matrix in which selection results in two output signals obtained by the replacement module are used as values of components corresponding to ranks of the respective two output signals, and generates the ranking model by solving a problem of maximizing a value of an upper triangle including components above diagonal components of the matrix.

2. The information processing apparatus according to claim 1, further comprising a group generation module configured to generate the group based on a time of occurrence of the output signal, wherein the reception module receives selection of the output signal corresponding to the root cause in the group generated by the group generation module.

3. The information processing apparatus according to claim 1, wherein the model generation module generates the ranking model by a heuristic method.

4. The information processing apparatus according to claim 3, wherein the model generation module arranges the plurality of output signals in a predetermined arrangement order and changes a rank of an output signal of a processing target among the plurality of output signals in accordance with a predetermined condition to generate a plurality of arrangement orders, obtains a value of the upper triangle of the matrix corresponding to each of the plurality of arrangement orders, and obtains one of the plurality of arrangement orders as the ranking model based on the value of the upper triangle.

5. The information processing apparatus according to claim 4, wherein the model generation module selects each of the plurality of output signals as a processing target and changes a rank of the output signals of the processing target at regular intervals to generate the plurality of arrangement orders.

6. The information processing apparatus according to claim 4, wherein the model generation module selects two output signals among the plurality of output signals as processing targets, and exchanges ranks of the two output signals of the processing targets to generate the plurality of arrangement orders.

7. The information processing apparatus according to claim 4, wherein the model generation module fixes ranks of at least a part of output signals that have not been selected as a root cause to ranks lower than ranks of output signals that have been selected as a root cause and changes ranks of output signals that are not fixed.

8. The information processing apparatus according to claim 1, wherein when the reception module receives selection of the output signal corresponding to the root cause in a newly obtained group of output signals, the model generation module updates the ranking model in response to a selection result of an output signal by the reception module.

9. The information processing apparatus according to claim 1, further comprising an estimation module configured to estimate, based on a plurality of output signals of estimation targets for the root cause and the ranking model, an output signal that is the root cause from among the plurality of output signals of the estimation targets.

10. An information processing apparatus comprising:

an acquisition module configured to acquire a plurality of first output signals that are estimation targets for a root cause; and an estimation module configured to estimate a first output signal that is a root cause from among the plurality of first output signals that are estimation targets for a root cause based on a ranking model generated by replacing a selection result of a second output signal that is a root cause in a group including a plurality of second output signals obtained in a predetermined period of time with a combination of selection results in two output signals selected from among the group.

11. An information processing method executed by an information processing apparatus, the information processing method comprising:

a reception step of receiving selection of an output signal corresponding to a root cause from a group including a plurality of output signals, the plurality of output signals being obtained from a plurality of devices to be managed and being obtained in a predetermined period;

a replacement step of replacing a selection result received at the reception step with a combination of the selection results in two output signals, the selection result being corresponding to the group, the two output signals being selected from the plurality of output signals; and a model generation step of generating a ranking model of the output signal based on the selection results after the replacement;

wherein the model generation step includes setting an arrangement order of the plurality of output signals as an arrangement order of each of a row and a column, generating a matrix in which selection results in two output signals obtained at the replacement step are used as values of components corresponding to ranks of the respective two output signals, and generating the ranking model by solving a problem of maximizing a value of an upper triangle including components above diagonal components of the matrix.

12. An information processing method executed by an information processing apparatus, the information processing method comprising:

an acquisition step of acquiring a plurality of first output signals that are estimation targets for a root cause; and an estimation step of estimating a first output signal that is a root cause from among the plurality of first output signals that are estimation targets for a root cause based on a ranking model generated by replacing a selection result of a second output signal that is a root cause in a group including a plurality of second output signals obtained in a predetermined period of time with a combination of selection results in two output signals selected from among the group.

13. A non-transitory computer-readable storage medium storing a program for causing a computer to execute a method for processing information, the method comprising:
- a reception step of receiving selection of an output signal corresponding to a root cause from a group including a plurality of output signals, the plurality of output signals being obtained from a plurality of devices to be managed and being obtained in a predetermined period;
- a replacement step of replacing a selection result received at the reception step with a combination of the selection results in two output signals, the selection result being corresponding to the group, the two output signals being selected from the plurality of output signals; and
- a model generation step of generating a ranking model of the output signal based on the selection results after the replacement;
- wherein the model generation step includes
   - setting an arrangement order of the plurality of output signals as an arrangement order of each of a row and a column,
   - generating a matrix in which selection results in two output signals obtained at the replacement step are used as values of components corresponding to ranks of the respective two output signals, and
   - generating the ranking model by solving a problem of maximizing a value of an upper triangle including components above diagonal components of the matrix.

14. A non-transitory computer-readable storage medium storing a program for causing a computer to execute a method for processing information, the method comprising:
- an acquisition step of acquiring a plurality of first output signals that are estimation targets for a root cause; and
- an estimation step of estimating a first output signal that is a root cause from among the plurality of first output signals that are estimation targets for a root cause based on a ranking model generated by replacing a selection result of a second output signal that is a root cause in a group including a plurality of second output signals obtained in a predetermined period of time with a combination of selection results in two output signals selected from among the group.

* * * * *